Patented Feb. 7, 1933

1,896,435

UNITED STATES PATENT OFFICE

HUGO WOLFF AND MAX ALBERT KUNZ, OF MANNHEIM, AND KARL KÖBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

VAT DYESTUFFS OF THE ANTHRAQUINONE SERIES

No Drawing. Application filed May 8, 1928, Serial No. 276,191, and in Germany May 20, 1927.

We have found that valuable vat dyestuffs possessing excellent properties as regards fastness may be obtained by treating with alkaline agents condensation products of the general formula:

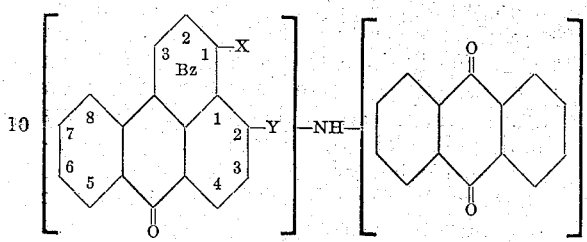

in which the aminoanthraquinonyl radicle may be attached to the benzanthronyl radicle instead of the substituent indicated by Y, in which case X must be hydrogen, or in which the aminoanthraquinonyl radicle is attached to the benzanthronyl radicle in a position other than those containing the substituents X and Y, in which case both X and Y may be hydrogen atoms, or X is a 2- or a Bz-1-benzanthronyl radicle or an etherified hydroxyl group, when Y is hydrogen, or Y is a 2- or Bz-1- benzanthronyl radicle when X is hydrogen.

The said initial materials are meant in the following description and the appended claims by the term anthraquinonyl-aminobenzanthrones. They may be obtained by condensing an aminoanthraquinone with suitable halogenated benzanthrones. Thus, for instance, initial materials are the condensation product from 1-aminoanthraquinone and halogenated Bzl.Bzl'-dibenzanthronyl which is obtainable from halogenbenzanthrone according to the method described in the German Patent No. 431,774, or by halogenating Bzl.Bzl'-dibenzanthronyls, or the condensation product from 1-aminoanthraquinone and halogenated Bzlmethoxy-benzanthrone obtainable by treating a halogenated Bz1-nitro-benzanthrone with methanol in the presence of alkaline agents, or the condensation products from an aminoanthraquinone and halogenated 2.Bzl'-dibenzanthronyls obtainable by halogenating 2.Bzl'-dibenzanthronyls, or the condensation products from an aminoanthraquinone and halogenated 2-2'-dibenzanthronyls.

The products obtained by condensation of more than one aminoanthraquinone with such benzanthrones of the said kind as contain more than one halogen may also be employed as initial materials as well as the products obtained by condensation of more than one halogenated benzanthrone of the said kind with such aminoanthraquinones as contain several amino groups. The treatment of the said initial materials with alkaline agents is best carried out at elevated temperatures, the precise range of temperature depends on the alkaline agent and the initial material employed in each case and is about between 130° and 200° C. or higher, when using alcoholic caustic alkalis, but may be higher such as 240° C. or more, when using for instance a melt of caustic alkalis.

Generally speaking the new vat dyestuffs obtained according to the present invention dye cotton dark blue or violet to grey-, blue- or deep black shades.

The following examples will further illustrate the nature of the said invention which however is not limited thereto. The parts are by weight.

*Example 1*

5 parts of 1'-anthraquinonyl-6-aminobenzanthrone which may be prepared by condensing 6-chlorbenzanthrone with 1-aminoanthraquinone are slowly introduced, while actively stirring, into 40 parts of fused caustic potash at 240° C. Stirring is continued for a short time at from 240° to 245° C. until no initial material is any longer detected in an unaltered condition whereupon the cooled melt is dissolved in hot water, and the blue black flakes of deposited dyestuff are filtered off. The resulting dyestuff is in the form of a black paste, which dries to a bronzy black powder giving a brownish-violet solution in concentrated sulfuric acid, the color changing to brown-olive on the addition of a few drops of nitric acid. The dyestuff is practically insoluble in organic solvents of high boiling point. With caustic soda solution and hydrosulphite, it gives a violet vat, from which very fast black dyeings are obtained on vegetable fibres. The dyeings produced are particularly noticeable with respect to their excellent fastness against bucking.

*Example 2*

4 parts of 1'-anthraquinonyl-6-aminobenzanthrone are fused with 20 parts of caustic potash and 15 parts of ethyl alcohol, at from about 175° to 200° C. until the formation of dyestuff ceases to increase. The reaction product is treated in the usual manner and the resulting dyestuff is very similar as regards its behaviour and reactions, to that obtained according to Example 1. It gives very fast bluish-black to black dyeings on vegetable fibres from a violet vat. The solution in concentrated sulfuric acid is of a muddy brown-violet color, changing to a muddy brown-olive color on the addition of a little nitric acid.

*Example 3*

100 parts of ground caustic potash are boiled together with 100 parts of methyl alcohol under a reflux cooler until a uniform thin-flowing melt is obtained. The temperature of the melt is brought to between 150° and 155° C. by distilling off part of the methyl alcohol whereupon 25 parts of 1'-anthraquinonyl-6-aminobenzanthrone are slowly introduced while stirring which is continued at the said temperature until the formation of the dyestuff is complete. The melt is then poured into water and the mixture heated to boiling in order to completely separate the dyestuff which is filtered while hot, washed until neutral and brought in the form of a paste. The black paste so obtained furnishes a violet vat with caustic soda solution and hydrosulphite from which the vegetable fibre is dyed very fast bluish-black shades of equal excellent properties than those obtained with the dyestuffs produced according to Examples 1 and 2. When dry the dyestuff forms a black powder which exhibits very similar properties to those of the dyestuffs obtained according to the above-mentioned examples.

Other suitable alcohols such as for instance propyl and isopropyl alcohol, butyl and isobutyl alcohol, amyl alcohol and the like may be used instead of methyl alcohol. With the aid of the said alcohols likewise bluish-black to black dyestuffs of similar excellent properties as regards fastness are obtained according to the nature of the alcohol employed, the duration of treatment and the temperature of the melt which may be varied between 150° to 200° C.

If the dyestuffs obtained according to Examples 2 and 3 with the aid of alcoholic caustic alkalis and dyeing bluish-black shades be subjected to a further treatment with a melt of caustic alkali according to Example 1 they are converted into dyestuffs which are more alike those obtained according to Example 1 dyeing a deeper black.

*Example 4*

5 parts of 1'-anthraquinonyl-8-aminobenzanthrone prepared for example by the condensation of 8-chlorbenzanthrone with 1-aminoanthraquinone, are stirred vigorously into 40 parts of fused caustic potash at from 270° to 275° C. and fused at from 275° to 280° C. until no further unaltered initial material can be detected. The cooled melt is boiled with water until the dyestuff has been completely separated, which is then filtered off while hot and washed. The resulting dyestuff is obtained in the form of a black paste, which is converted into a dark powder with a bronze sheen by drying. It dissolves to a dirty violet-brown solution in concentrated sulfuric acid, the color turning to olive-brown on the addition of a little nitric acid. In solvents of high boiling point the dyestuff is practically insoluble. With caustic soda solution and hydrosulphite it furnishes a blue-grey vat from which very fast black dyeings are obtained on vegetable fibres.

A similar dyestuff is obtained by fusing the 1'-anthraquinonyl-8-aminobenzanthrone with alcoholic potash at about 180° C. instead of with caustic potash.

*Example 5*

10 parts of 4'-methoxy-1'-anthraquinonyl-6-aminobenzanthrone, prepared for example by the condensation of 6-halogenbenzanthrone with 1-amino-4-methoxyanthraquinone, are fused at from 170° to 180° C. with 40 to 50 parts of caustic potash and 30 to 40 parts of ethyl alcohol until the formation of the dyestuff is complete. By treating the product in the usual manner, the dyestuff is in the form of a black paste, furnishing a dark powder, with a metallic lustre, when dried. The powder dissolves to a brownish-violet solution in concentrated sulfuric acid. With caustic soda solution and hydrosulphite, the dyestuff furnishes a red-violet vat, from which violet-blue dyeings are obtained on cotton, the color changing to a very handsome and fast blue-black after washing and exposure to the air.

Example 6

5 parts of 1'-anthraquinonyl-7-aminobenzanthrone, prepared for example, from 7-halogenbenzanthrone with 1-aminoanthraquinone, are fused, at from 170° to 180° C. with 20 parts of caustic potash and 15 parts of alcohol until no more unaltered initial material can be detected. The melt is treated in the usual manner and the resulting dyestuff forms a deep violet paste and, when dried, a dark powder with a metallic lustre. The powder dissolves to a violet solution, with a brownish tinge, in concentrated sulfuric acid, the color changing to dark brown on the addition of a few drops of nitric acid. With caustic soda solution and hydrosulphite, the dyestuff furnishes a blue vat, from which very fast dark blue dyeings are obtained on vegetable fibres. The color possesses the property, rare in the case of dyestuffs of the benzanthrone series, of not acquiring a more reddish cast when moistened with water.

The same dyestuff is obtained by fusing the 1'-anthraquinonyl-7-aminobenzanthrone with caustic potash at from 240° to 250° C. instead of with alcoholic potash.

Example 7

5 parts of the condensation product from 1 molecular proportion of 6-chlorbenzanthrone and 1 molecular proportion of 1.6-diaminoanthraquinone are introduced into 40 parts of fused caustic potash at about 250° C. and fused for a short time at from 260° to 265° C. The resulting dyestuff is in the form of a black paste, drying to a black powder which dissolves to a brown solution, with a violet tinge, in concentrated sulfuric acid, and furnishes, with hydrosulphite and caustic soda solution, a violet-brown vat, from which fast blackish-brown dyeings are obtained on vegetable fibres.

Example 8

If 5 parts of the condensation product from 1 molecular proportion of 1.5-diaminoanthraquinone and 1 molecular proportion of 6-chlorbenzanthrone be fused with caustic potash as described in Example 7, a dyestuff is obtained in the form of a black paste, which dissolves to a blue solution in the vat, and gives dark-grey dyeings on the fibre. The dyestuff dissolves to a violet-brown solution in concentrated sulfuric acid, the color changing to dark-brown on the addition of a few drops of nitric acid.

A similar dyestuff is obtained on fusing the condensation product from 1 molecular proportion of 1.5-diaminoanthraquinone and 2 molecular proportions of 6-chlorbenzanthrone, with caustic potash.

Example 9

If 5 parts of 1'-anthraquinonyl-Bz2-aminobenzanthrone prepared for example by the condensation of Bz2-halogenbezanthrone with 1-aminoanthraquinone be fused with a six to eight fold quantity of caustic potash at from 250 to 260° C, a dyestuff is obtained in the form of a dark olive paste, which dissolves to a brownish-violet solution with caustic soda solution and hydrosulphite, dark olive dyeings being obtained, from this vat, on vegetable fibres. In the dry state the dyestuff forms a dark powder which dissolves to a greyish-blue solution in concentrated sulfuric acid, the color changing to olive-brown on the addition of a few drops of nitric acid.

A similar dyestuff which, however, dyes purer shades is obtained when carrying out the process with alcoholic caustic potash, for instance methyl alcoholic caustic potash, at about from 150° to 160° C., instead of caustic potash.

Example 10

25 parts of a mixture of 1'-anthraquinonyl-6-aminobenzanthrone and 1'-anthraquinonyl-7-aminobenzanthrone which may be obtained by condensation of a mixture of 6-and 7-chlorbenzanthrone with 1-aminoanthraquinone are slowly introduced at a temperature between 150° and 155° C. into a solution of 100 parts of caustic potash in 50 parts of methyl alcohol while stirring which is continued at the said temperature until the formation of the dyestuff is complete. The cooled melt is brought into water and the mixture is boiled until the dyestuff is completely separated which is filtered and washed with hot water until neutral. A dyestuff is obtained in the form of a dark paste which dyes the vegetable fibre very fast dark blue shades from a blue-violet vat. The colorations so obtained are particularly remarkable owing to their excellent fastness against bucking which is practically perfect. Other alcohols such as ethyl-, propyl-, or butyl alcohols and the like may be used instead of the methyl alcohol. Likewise the before-mentioned amounts of caustic potash and alcohol as well as the temperatures used may be varied in rather wide limits.

Example 11

5 parts of the condensation product of 1 molecular proportion of 6-aminobenzanthrone and 1 molecular proportion of 1-chlor-anthraquinone-2-carboxylic acid are treated with a mixture of 20 parts of caustic potash and 15 parts of ethyl alcohol at between 190° and 200° C. until the formation of the dyestuff is complete. The melt is worked up as usual and the dyestuff is obtained in the form of a black paste which dissolves to a violet-brown vat from which the vegetable fibre is dyed fast black shades. When dry the dyestuff forms a black powder which dissolves in concentrated sulfuric acid to an olive-green solution.

A similar dyestuff is produced when melting the aforesaid condensation product with caustic potash at temperatures between 240° and 260° C.

*Example 12*

5 parts of 2'-anthraquinonyl-6-aminobenzanthrone obtainable by condensation of 6-chlorbenzanthrone and 2-aminoanthraquinone are introduced at 190° to 195° C. into a melt of 40 parts of caustic potash and 20 parts of ethyl alcohol. The temperature of the melt is gradually raised to 210° to 220° C. and stirring is continued at the said temperature until the formation of the dyestuff is complete. The cooled melt is boiled with water, the separated dyestuff filtered off and washed. A black paste is obtained which furnishes with a solution of caustic soda and hydrosulphite a brown-violet vat from which cotton is dyed fast grey black shades. When dry the dyestuff forms a black powder which dissolves to a blue-green solution in concentrated sulfuric acid.

Similar dyestuffs are produced when employing condensation products in which the 2-aminoanthraquinone is substituted by a derivative, for instance by 2-amino-2-chloranthraquinone.

*Example 13*

10 parts of the condensation product from 1 molecular proportion of 6.6'-dichlor-2-2'-dibenzanthronyl and 2 molecular proportions of 1-amino-anthraquinone are introduced into a six to ten fold quantity of fused caustic potash at from 250 to 260° C. and heated at from 260° to 265° C. until the formation of the dyestuff is complete. The melt is treated in the usual manner, by boiling with water, filtering and washing. The resulting dyestuff is in the form of a black paste, drying to a dark powder with a metallic lustre and furnishing with caustic soda solution and hydrosulphite a violet vat, from which very fast black dyeings are obtained on vegetable fibres. The dyestuff dissolves to a violet solution in concentrated sulfuric acid, and is identical with the product described in Example 1.

A similar dyestuff is obtained by fusing with caustic potash the condensation product from 1 molecular proportion of 6.6'-dichlor-2.2'-dibenzanthronyl and 1 molecular proportion of 1-aminoanthraquinone.

*Example 14*

4 parts of the condensation product from 6-chlor-2.2'-dibenzanthronyl and 1-aminoanthraquinone are fused at from 255° to 265° C. with 40 parts of caustic potash until no more unaltered initial material can be detected. The resulting dyestuff is in the form of a black paste, drying to a dark powder with a metallic lustre and furnishing, with caustic soda solution and hydrosulphite, a violet vat, from which very handsome and fast bluish-black dyeings are obtained on cotton. The dyestuff dissolves to a violet solution in concentrated sulfuric acid, the color changing on the addition of a few drops of nitric acid, to a green which becomes a grayish-black after a short time.

*Example 15*

10 parts of the condensation product from 1 molecular proportion of 7.7'-dichlor-2.2'-dibenzanthronyl and 2 molecular proportions of 1-aminoanthraquinone are fused with caustic potash as described in Example 13. The resulting dyestuff is in the form of a dark violet paste, drying to a dark powder, with a metallic lustre which dissolves to a violet solution in concentrated sulfuric acid. With caustic soda solution and hydrosulphite the dyestuff furnishes a blue vat from which very fast, handsome dark blue dyeings are obtained on vegetable fibres. The dyestuff, which analysis shows to contain 2 atoms of nitrogen, is identical with that of Example 6.

*Example 16*

10 parts of the condensation product of 1 molecular proportion of 6.6'-dichlor-2.2'-dibenzanthronyl and 2 molecular proportions of 1-amino-4-methoxy-anthraquinone are treated with 40 parts of caustic potash and 25 and 30 parts of ethyl alcohol at between 160° and 165° C. until no unchanged initial material can any more be detected. The cooled melt is worked up with water in the usual manner. The dyestuff so obtained forms a black paste furnishing a red violet vat from which the vegetable fibre is dyed fast black shades. When dry the dyestuff forms a black powder dissolving to a violet solution with a brownish tinge in concentrated sulfuric acid.

A similar dyestuff dyeing shades with a more bluish tinge is obtained when subjecting the condensation product of 1 molecular proportion of 6.6'-dichlor-2.2'-dibenzanthronyl and 1 molecular proportion of 1-amino-4-methoxyanthraquinone to a treatment with alcoholic caustic potash.

*Example 17*

10 parts of the condensation product of brominated 2.2'-dibenz-anthronyl (obtainable by brominating 2.3'-dibenzanthronyl in nitrobenzene or chlorsulfonic acid) and 1-amino-anthraquinone are heated to boiling under a reflux condenser while stirring with 300 parts of anhydrous aniline and 30 parts of finely ground caustic potash until the formation of the dyestuff is complete. After the melt has been cooled down to about 80° C., it is filtered by suction and the residue washed with hot ethyl alcohol and water. For the purpose of purification the crude dyestuff may be boiled with dissolving media of high boiling point. The pure dyestuff forms a black powder dissolving to a violet solution in concentrated sulfuric acid and furnishing with a solution of caustic soda and hydrosulphite a red violet vat from which the vegetable fibre is dyed beautiful fast black shades with a bluish tinge.

Example 18

25 parts of the condensation product of 1 molecular proportion of 6.6'-dichlor-2.2'-dibenzanthronyl and 2 molecular proportions of 1-aminoanthraquinone are slowly introduced at a temperature between 150° to 155° C. into a solution of 100 parts of caustic potash in 50 to 60 parts of methyl alcohol while stirring. The temperature of the melt is raised to between 160° to 170° C. and stirring is continued at the said temperature until the formation of the dyestuff is complete. The melt is poured into water and heated to boiling until the dyestuff is completely separated. The black paste so obtained dyes the vegetable fibres fast black shades with a bluish tinge from a red violet vat.

Other alcohols, such as ethyl-, propyl- and butyl alcohols and the like may be used instead of methyl alcohol. Likewise the aforementioned amounts of caustic potash and alcohol and the temperatures of the melt may be varied within rather wide limits whereby dyestuffs are obtained which are similar to the above-described one and dye cotton from dark blue and blue-black to black shades according to the amount of the dye-stuff employed. Similar dyestuffs are also obtained when subjecting condensation products of 2 molecular proportions of diaminoanthraquinones for instance 1.6-diaminoanthraquinone and 1 molecular proportion of 6.6'-dichlor-2.2'-dibenzanthronyl to a treatment with a melt of caustic potash or alcoholic caustic potash instead of the above-mentioned condensation product.

Example 19

10 parts of the condensation product from 1 molecular proportion of 6.6'-dichlor-Bz1.Bz1'-dibenzanthronyl and 2 molecular proportions of 1-aminoanthraquinone are introduced at about 240° C. into the six to eight fold quantity of fused caustic potash and fused at from 240° to 250° C. until no more unaltered initial material can be detected. The cooled melt is boiled with water and the dyestuff is filtered while hot and washed. The dyestuff obtained in a very good yield forms a black paste, which dyes the vegetable fibre from a violet vat very fast black shades. The properties of the dyestuff are similar to those of the dyestuff described in Example 13.

When using alcoholic caustic potash instead of caustic potash and fusing at temperatures between 130 and 140° C. a dyestuff is obtained, which dyes shades of a more bluish tinge than the above described dyestuff.

Similar dyestuffs are obtained by fusing the condensation product from 1 molecular proportion of 6.6'-dichlor-Bz1.Bz1'-dibenzanthronyl and 1 molecular proportion of 1-aminoanthraquinone with caustic potash.

Example 20

10 parts of the condensation product from 1 molecular proportion of 8.8'-dichlor-Bz1.Bz1'-dibenzanthronyl and 2 molecular proportions of 1-aminoanthraquinone are fused with 40 to 50 parts of caustic potash and 30 to 40 parts of alcohol at from about 130 to 150° C. until the formation of the dyestuff is complete. The melt is worked up in the usual way. The dyestuff is obtained as a black paste which forms a black powder when dry and dissolves in concentrated sulfuric acid with a blue-violet coloration which changes to bottle-green when adding a few drops of nitric acid. The dyestuff gives a blue vat with a violet tinge with caustic soda solution and hydrosulphite, from which very fast black dyeings are obtained on the fibre.

Example 21

When treating the condensation product from 1 molecular proportion of 7.7'-dichlor-Bz1.Bz1'-dibenzanthronyl and 2 molecular proportions of 1-aminoanthraquinone in the way described in Example 20, a dyestuff is obtained in the form of a black paste, which dries to a violet-black powder and dissolves in concentrated sulfuric acid to a violet solution changing to dark-brown on the addition of a few drops of nitric acid. The dyestuff which is very similar to those obtained according to Examples 6 and 15, dyes the vegetable fibre very fast dark-blue shades, not changing to red when moistened, from a blue vat.

Example 22

5 parts of the condensation product from 1 molecular proportion of 6.6'-dichlor-Bz1.Bz1'-dibenzanthronyl and 2 molecular proportions of 1-amino-4-methoxyanthraquinone are boiled under a reflux condenser with 150 parts of aniline free from water and 15 parts of finely ground caustic potash until the formation of the dyestuff is complete. The reaction product after being cooled to about 80° C. is sucked off and the dyestuff is washed with hot alcohol and water and is extracted by boiling with aniline for purifying it, if desired. The purified dyestuff is a black powder which dissolves in concentrated sulfuric acid to a clear bluish-violet solution from which the dyestuff is obtained in the form of a black paste when pouring the solution into water. The paste furnishes a reddish-violet vat with caustic soda solution and hydrosulphite, from which very fast and handsome bluish-black shades are obtained on vegetable fibres.

Very similar dyestuffs are obtained when fusing the said condensation product with alcoholic caustic potash or with caustic potash in the way described in Examples 12 to 14, instead of with caustic potash in boiling aniline, or when substituting for the above-mentioned condensation products another prepared with only 1 molecule of 1-amino-4-methoxyanthraquinone.

*Example 23*

10 parts of the condensation product from 1 molecular proportion of 6.6'-dichlor-Bz1.Bz1'-dibenzanthronyl and 2 molecular proportions 1-amino-4-hydroxyanthraquinone are fused with alcoholic caustic potash in the way described in Example 20 at temperatures between about 130 and 180° C. After working up the melt, the dyestuff is obtained in the usual way in the form of a blue-black to black paste furnishing a reddish violet vat from which the vegetable fibre is dyed shades varying from dark blue to blue-black according to the temperatures of the melt. Thus for instance, the dyestuff prepared at temperatures between 130° and 135° C. dyes dark blue shades, whereas the dyestuff obtained at higher temperatures, for example, at from 170° to 180° C. dyes very fast blue-black shades, which do not change when moistened with water or with dilute acids. The dyestuffs are black powders when dry, which dissolve to violet solutions with a blue tinge in concentrated sulfuric acid.

*Example 24*

5 parts of the condensation product from 1 molecular proportion of 6.6'-dichlor-Bz1.Bz1'-dibenzanthronyl and 2 molecular proportions of 1-aminoanthraquinone are introduced at from about 100° to 125° C. into a solution or a suspension respectively of sodium anilide in aniline prepared by dissolving 3 parts of metallic sodium in 200 parts of aniline free from water while passing through a current of nitrogen. The mixture is heated in a current of nitrogen to between 120° and 125° C. until no more dyestuff is formed. The violet mixture is filtered at about 80° C. and the residue containing aniline is poured into dilute hydrochloric acid; the separated dyestuff may be purified by extracting it with boiling aniline or with other organic solvents of a high boiling point.

*Example 25*

10 parts of the condensation product from brominated Bz1.Bz1'-dibenzanthronyl (prepared by brominating Bz1.Bz1'-dibenzanthronyl in nitrobenzene) and 1-aminoanthraquinone are fused with alcoholic caustic potash as described in Example 20. By working up the melt in the usual way the dyestuff is obtained as a black paste, furnishing a violet vat with a solution of caustic soda and hydrosulphite, from which the vegetable fibre is dyed handsome bluish black shades. The dyestuff is a black powder when dry, which dissolves in concentrated sulfuric acid to a violet solution, which changes to a dark brown when adding a few drops of nitric acid.

Similar vat dyestuffs dyeing black shades are obtained when fusing with caustic alkali the condensation products of 1-aminoanthraquinone and Bz1. Bz1'-dibenzanthronyls brominated by another method such as, for instance, may be obtained by brominating in chlorsulfonic acid, instead of the above mentioned brominated Bz1.Bz1'-dibenzanthronyl.

*Example 26*

10 parts of the condensation product from 1 molecular proportion of 6.6'-dichlor-Bz1.Bz1'-dibenzanthronyl and 2 molecular proportions of 1.6-diaminoanthraquinone are fused with alcoholic caustic potash at from about 130° to 140° C. as described in Example 20. The dyestuff is a black paste forming a black powder when dry, which dissolves to a violet solution in concentrated sulfuric acid, and which furnishes a violet vat with caustic soda solution and hydrosulphite, from which cotton is dyed grey black shades.

Similar dyestuffs are obtained when treating a condensation product in which 1.6-diaminoanthraquinone is substituted by another diaminoanthraquinone.

*Example 27*

10 parts of the condensation product from 6-halogen-Bz1-methoxybenzanthrone and 1-aminoanthraquinone are fused with 40 to 50 parts of caustic potash and 30 to 40 parts of alcohol at from about 150° to 160° C. until no more unaltered initial material can be detected. The cooled melt is boiled with water, and the dyestuff is completely separated by passing in a current of air, filtered off while hot and washed. The dyestuff is obtained in the form of a black paste forming a black powder when dry, which dissolves to a green solution in concentrated sulfuric acid and furnishes a brown-violet vat with caustic soda solution and hydrosulphite from which the vegetable fibre is dyed fast black shades.

*Example 28*

If 10 parts of the condensation product from 8-halogen-Bz1-methoxybenzanthrone and 1-aminoanthraquinone be fused with alcoholic caustic potash as described in Example 20 a dyestuff is obtained in the form of a black paste which dyes the fibre grey-black shades from a blue-green vat. The dried dyestuff is a black powder, which dissolves in concentrated sulfuric acid to a green solution.

*Example 29*

If the condensation product from 7-halogen-Bz1-methoxybenzanthrone and 1-aminoanthraquinone be fused with alcoholic caustic potash as described in Example 20, a dyestuff is obtained, after working up the melt as usual, in the form of a black paste furnishing a blue vat with caustic soda solution and hydrosulphite, from which the vegetable fibre is dyed fast dark violet-blue shades, which do not change to red when moistened with water. The dyestuff is a violet-black powder when dry, which may be purified by extraction by boiling with suitable solvents and dissolves to a green solution in concentrated sulfuric acid.

*Example 30*

10 parts of the condensation product from brom-Bz1-methoxybenzanthrone obtainable for instance by brominating Bz1-methoxybenzanthrone in glacial acetic acid, and 1-aminoanthraquinone are fused at from 150° to 160° C. with alcoholic caustic potash. After the melt has been worked up, an olive-black paste is obtained furnishing a brown-violet vat with caustic soda solution and hydrosulphite from which the vegetable fibre is dyed very fast dark olive shades. The dyestuff is an olive-black powder when dry, which dissolves to a violet solution with a brown tinge in concentrated sulfuric acid.

*Example 31*

10 parts of the condensation product of 6-halogen-Bz1-phenoxybenzanthrone (obtainable by heating 6-halogen-Bz1-brombenzanthrone with potassium phenolate and copper oxid) and 1-aminoanthraquinone are heated with a mixture of 40 parts of caustic potash and from 25 to 30 parts of ethyl alcohol to between 170° and 180° C. until the formation of the dyestuff is complete whereupon the reaction mixture is worked up in the usual manner. The dyestuff is obtained in the form of a black paste and furnishes with a solution of caustic soda and hydrosulphite a gray-black paste dissolving to a green solution in concentrated sulfuric acid.

A similar vat dyestuff dyeing black shades is obtained when subjecting a condensation product of 6-halogen-Bz1-phenoxybenzanthrone and 1-amino-4-methoxyanthraquinone to a treatment with alcoholic caustic potash instead of the above mentioned condensation product.

*Example 32*

5 parts of the condensation product of 6-halogen-Bz1-methoxybenzanthrone and 1-amino-4-methoxyanthraquinone are treated with a mixture of 20 parts of caustic potash and 15 parts of methyl alcohol at about 190° to 200° C. until no unchanged initial material can anymore be detected. The cooled melt is worked up in the usual manner. The dyestuff is obtained in the form of a black paste furnishing with a solution of caustic soda and hydrosulphite a violet vat with a brownish tinge from which the vegetable fibre is dyed fast black shades. When dry the dyestuff is a black powder dissolving to a dull brown-violet solution in concentrated sulfuric acid.

*Example 33*

10 parts of 1'-anthraquinonyl-2-aminobenzanthrone, prepared, for example, by condensing 2-chlorbenzanthrone with 1-aminoanthraquinone, are slowly introduced while actively stirring, into 60 parts of fused caustich potash at temperatures from about 230° to 300° C. It is advisable according to this method of working, previously to bring the crystallized 2-benzanthronyl-1-aminoanthraquinone into a finely distributed condition by dissolving it in concentrated sulfuric acid and, pouring this solution into water. When the whole of the said condensation product has been introduced, the temperature is maintained at the specified level until the formation of dyestuff ceases to increase. The cooled melt is distributed in water and is boiled until the dyestuff is completely deposited, whereupon it is filtered while hot and washed with hot water. The resulting dyestuff is in the form of a black paste, or when dry of a black powder and dissolves in concentrated sulfuric acid to a blue violet solution which turns red-brown on the addition of a few drops of nitric acid. With caustic soda solution and hydrosulphite, the dyestuff gives a violet-blue vat, from which very fast black dyeings are obtained on vegetable fibres.

The conditions of temperature most favorable for the formation of the black dyestuff depend chiefly on the water content of the caustic potash employed. When the water content is very low, the best conditions for the formation of the black vat dyestuff are obtained with low melt temperatures (about 230° to 250° C.); but if the water content is higher, the temperature of the melt must be raised to 270° C. and higher.

*Example 34*

4 parts of the condensation product from 1 molecular proportion of 1.5-diaminoanthraquinone and 2 molecular proportions of 2-chlorbenzanthrone are slowly introduced, while actively stirring, into 30 parts of fused caustic potash at from 260° to 265° C. Stirring is continued, at the said temperature, until the formation of dyestuff is complete, whereupon the cooled melt is distributed in water and the dyestuff precipitated in the usual way. In this manner the dyestuff is obtained in the form of a black paste, furnishing, with caustic soda solution and hydrosulphite, a violet-blue vat from which very fast black dyeings with a bluish tinge are obtained on vegetable fibres. In the dry state, the dyestuff forms a black powder which dissolves in concentrated sulfuric acid to a blue solution, the color of which turns to brown violet on addition of a few drops of nitric acid.

*Example 35*

8 parts of 4'-methoxy-1'-anthraquinonyl-2-aminobenzanthrone, obtained for example from 1-amino-4-methoxyanthraquinone and 2-chlorbenzanthrone, are well stirred and fused with 80 parts of caustic potash at about 240° C. until no unaltered initial product can any longer be detected. The melt is treated in the usual manner. The resulting dyestuff is in the form of a black paste, or of a black powder when dry, which dissolves in concentrated sulfuric acid to a brown-violet solution turning through olive-green to a muddy brown on the addition of a few drops of nitric acid. With caustic soda solution and hydrosulphite, the dyestuff furnishes a violet vat from which very fast black dyeings, with bluish tinge, are obtained on vegetable fibres.

*Example 36*

4 parts of the condensation product from 1.6-diaminoanthraquinone and 1 molecule of 2-chlorbenzanthrone are stirred and fused with 40 parts of caustic potash at from 235° to 240° C. until the formation of the dyestuff is complete. The dyestuff treated in the usual manner is in the form of a black paste which gives fast black dyeings on vegetable fibres from the violet-blue vat. In the dry state, the dyestuff is a black powder, dissolving in concentrated sulfuric acid to a blue solution which turns red on the addition of a few drops of nitric acid. In solvents of high boiling point, such as nitrobenzene, the dyestuffs very little soluble in the warm, the color of the solution being green with a faint red-brown fluorescence.

*Example 37*

10 parts of 2.6-di-(1'-anthraquinonyl-amino)-benzanthrone (obtainable from 1 molecular proportion of 2.6-dichlorbenzanthrone and 2 molecular proportions of 1-aminoanthraquinone) are slowly introduced at between 190° and 195° C. into a mixture of 40 parts of caustic potash and from 25 to 30 parts of ethyl alcohol while stirring. The temperature of the reaction mixture is gradually raised to between 210 and 215° C. and stirring is continued at the said temperature until the formation of the dyestuff is complete. By working up the reaction product in the usual manner the dyestuff is obtained in the form of a black paste furnishing with a solution of caustic soda and hydrosulphite a violet vat from which the vegetable fibre is dyed fast black shades. When dry the dyestuff is a black powder which may be purified by boiling it with dissolving media of high boiling point, such as for instance nitrobenzene, and dissolves to a violet solution in concentrated sulfuric acid. If the above-mentioned initial material be replaced by the condensation product from 1 molecular proportion of 2.7-dichlorbenzanthrone and 2 molecular proportions of 1-aminoanthraquinone and treated in the above described manner, a dyestuff is obtained furnishing fast dark blue colorations which do not turn red when moistened with water.

*Example 38*

5 parts of the condensation product of 1 molecular proportion of 2.7-dichlorbenzanthrone and 2 molecular proportions of 1-amino-4-methoxyanthraquinone are treated in the manner described in Example 37. The dyestuff is obtained in the form of a black paste furnishing a blue-violet vat from which the vegetable fibre is dyed black shades. When dry the dyestuff is a black powder dissolving to a brown-violet solution in concentrated sulfuric acid.

*Example 39*

10 parts of the condensation product of 6-chlor-2-Bz1'-dibenzanthronyl and 1-aminoanthraquinone are treated with a mixture of 40 to 50 parts of caustic potash and 30 to 40 parts of ethyl alcohol at a temperature between 170° and 180° C. until the formation of the dyestuff is complete. The reaction product is worked up as usual. The dyestuff so obtained forms a black paste and when dry a black powder dissolving to a green solution in concentrated sulfuric acid which solution turns dull olive-brown when adding some nitric acid. With a solution of caustic soda and hydrosulphite the dyestuff furnishes a blue vat from which the vegetable fibre is dyed dark blue shades turning to a very fast dark violet after washing and drying. The dyestuff is only sparingly soluble in organic solvents of high boiling point thus for instance only traces are dissolved in boiling nitrobenzene forming a blue solution with an intensive red-brown fluorescence.

*Example 40*

10 parts of the condensation product of 1 molecular proportion of brominated 2-Bz1'-dibenzanthronyl (obtainable by introducing 2-Bz1'-dibenzanthronyl into an excess of bromine and leaving the reaction mixture at rest for some time at a temperature between 40° and 45° C. The main reaction product being a dibrom derivative) and 2 molecular proportions of 1-amino-4-methoxyanthraquinone are treated at between 170° and 180° C. with alcoholic caustic potash as described in the foregoing example. By working up the reaction product in the usual manner, the dyestuff is obtained in the form of a black paste furnishing with a solution of caustic soda and hydrosulphite a grey-blue vat from which cotton is dyed very fast dark blue shades. The colorations exhibit the remarkable property rare with dyestuffs of the isodibenzanthrone series of practically not turning red when moistened with water, the dyestuff dissolves in concentrated sulfuric acid to a bottle-green solution which coloration turns dull brown by addition of a few drops of nitric acid.

Example 41

10 parts of the condensation product of 1 molecular proportion of brominated 2-Bz1'-dibenzanthronyl and 2 molecular proportions of 1.6-diaminoanthraquinone are treated with alcoholic caustic potash at a temperature between 170° and 180° C. in the manner described in Example 39 until no unchanged initial material can anymore be detected. The dyestuff worked up in the usual manner is a black paste and a black powder, when dry, dissolving to a bottle-green solution in concentrated sulfuric acid which coloration turns turbid brown by the addition of some nitric acid. With a solution of caustic soda and hydrosulphite the dyestuff furnishes a grey-blue vat from which the vegetable fibre is dyed fast black shades with a bluish tinge.

Example 42

10 parts of the condensation product of 6-chlor-2-Bz1'-dibenzanthronyl and 1-aminoanthraquinone are introduced at about 230° C. into the 6 to 10 fold amount of melted caustic potash and heating to between 230° and 250° C. is continued until the formation of the dyestuff is complete. The cooled melt is taken up with water, the reaction mixture heated to boiling, filtered while hot and the filter cake washed. The dyestuff so obtained appears to be identical with that described in Example 39.

Example 43

10 parts of the condensation product of 1 molecular proportion of brominated 2-Bz1'-dibenzanthronyl and 2 molecular proportions of β-amino-alizarin are treated with alcoholic caustic potash in the manner described in Example 40. The crude dyestuff so obtained forms a black paste, and a black powder, when dry, dissolving to an olive brown solution in concentrated sulfuric acid, the coloration of the solution turning brown by the addition of a few drops of nitric acid. With a solution of caustic soda and hydrosulphite the dyestuff furnishes a greenish-grey vat from which the vegetable fibre is dyed fast black shades with a violet tinge.

Example 44

4 parts of the condensation product of 1 molecular proportion of brominated 2-Bz1'-dibenzanthronyl and 2 molecular proportions of 1-aminoanthraquinone are introduced at about 150° to 160° C. while stirring into a solution or suspension of 15 parts of sodium anilide and 200 parts of anhydrous aniline while passing a stream of nitrogen through the solution. The temperature is then raised to the boiling point of the aniline and stirring is continued for some further hours until no unchanged initial material can any more be detected. After cooling down to 80° C. the melt is filtered by suction and the residue containing aniline is passed into dilute hydrochloric acid and the separated dyestuff is filtered off, washed and dried. The dyestuff may be purified by extraction with boiling nitrobenzene or other suitable solvents and forms a black powder dissolving in the crude state to a red-brown, when pure to a green solution in concentrated sulfuric acid and furnishes with a solution of caustic soda and hydrosulphite a grey-blue vat from which the vegetable fibre is dyed very fast black shades with a bluish tinge.

What we claim is:

1. As new articles of manufacture, vat dyestuffs obtainable by condensing a condensation product of the general formula:

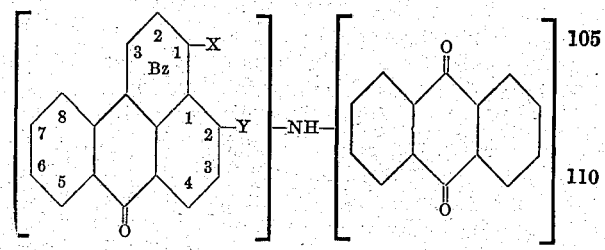

in which the iminoanthraquinone radicle may be attached to the benzanthrone radicle instead of the substituent indicated by Y, in which case X must be hydrogen, or in which the iminoanthraquinone radicle is attached to the benzanthrone radicle in a position other than those containing the substituents X and Y, in which case both X and Y may be hydrogen atoms, or X is a 2- or a Bz-1-benzanthrone radicle or an etherified hydroxyl group, when Y is hydrogen, or Y is a 2- or Bz-1-benzanthrone radicle when X is hydrogen, by means of an alkaline agent at elevated temperatures, furnishing blue to violet vats and dissolving to brown-violet solutions in concentrated sulfuric acid.

2. The process of producing new vat dyestuffs which comprises condensing a condensation product of the general formula:

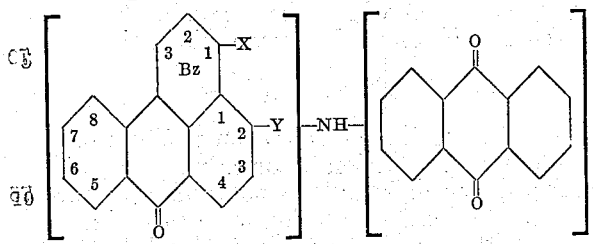

in which the iminoanthraquinone radicle may be attached to the benzanthrone radicle instead of the substituent indicated by Y, in which case X must be hydrogen, or in which the iminoanthraquinone radicle is attached to the benzanthrone radicle in a position other than those containing the substituents X and Y, in which case both X and Y may be hydrogen atoms, or X is a 2- or a Bz-1-benzanthrone radicle or an etherified hydroxyl group, when Y is hydrogen, or Y is a 2- or Bz-1-benzanthrone radicle when X is hydrogen, by means of an alkaline agent at elevated temperature.

3. The process of producing new vat dyestuffs which comprises condensing a condensation product of the general formula:

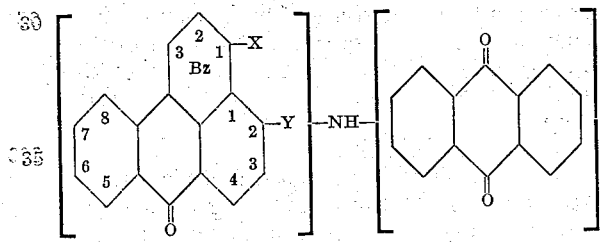

in which the iminoanthraquinone radicle may be attached to the benzanthrone radicle instead of the substituent indicated by Y, in which case X must be hydrogen, or in which the iminoanthraquinone radicle is attached to the benzanthrone radicle in a position other than those containing the substituents X and Y, in which case both X and Y may be hydrogen atoms, or X is a 2- or a Bz-1-benzanthrone radicle or an etherified hydroxyl group, when Y is hydrogen, or Y is a 2- or Bz-1-benzanthrone radicle when X is hydrogen, by means of caustic alkali at elevated temperature.

4. The process of producing new vat dyestuffs which comprises condensing a condensation product of the general formula:

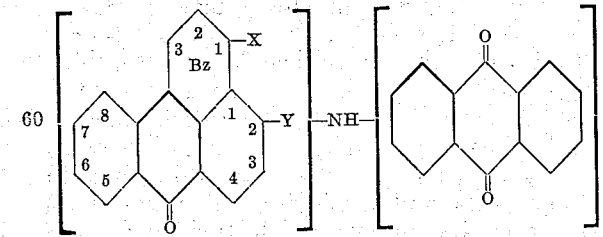

in which the iminoanthraquinone radicle may be attached to the benzanthrone radicle instead of the substituent indicated by Y, in which case X must be hydrogen, or in which the iminoanthraquinone radicle is attached to the benzanthrone radicle in a position other than those containing the substituents X and Y, in which case both X and Y may be hydrogen atoms, or X is a 2- or a Bz-1-benzanthrone radicle or an etherified hydroxyl group, when Y is hydrogen, or Y is a 2- or Bz-1-benzanthrone radicle when X is hydrogen, by means of caustic alkali above 130° C.

5. The process of producing new vat dyestuffs which comprises condensing a condensation product of the general formula:

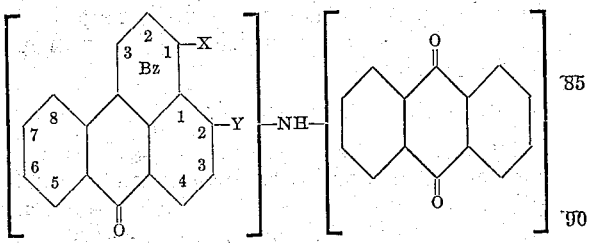

in which the iminoanthraquinone radicle may be attached to the benzanthrone radicle instead of the substituent indicated by Y, in which case X must be hydrogen, or in which the iminoanthraquinone radicle is attached to the benzanthrone radicle in a position other than those containing the substituents X and Y, in which case both X and Y may be hydrogen atoms, or X is a 2- or a Bz-1-benzanthrone radicle or an etherified hydroxyl group, when Y is hydrogen, or Y is a 2- or Bz-1-benzanthrone radicle when X is hydrogen, by means of an alcoholic caustic alkali above 130° C.

6. The process of producing new vat dyestuffs which comprises condensing a condensation product of the general formula:

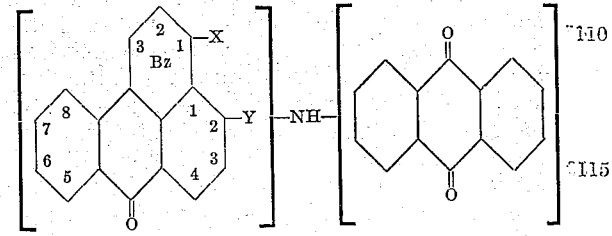

in which the iminoanthraquinone radicle may be attached to the benzanthrone radicle instead of the substituent indicated by Y, in which case X must be hydrogen, or in which the iminoanthraquinone radicle is attached to the benzanthrone radicle in a position other than those containing the substituents X and Y, in which case both X and Y may be hydrogen atoms, or X is a 2- or a Bz-1-benzanthrone radicle or an etherified hydroxyl group, when Y is hydrogen, or Y is a 2- or Bz-1-benzanthrone radicle when X is hydrogen, by means of alcoholic caustic alkali at temperatures between about 130° and 180° C.

7. As new articles of manufacture the vat dyestuffs probably corresponding to the formula:

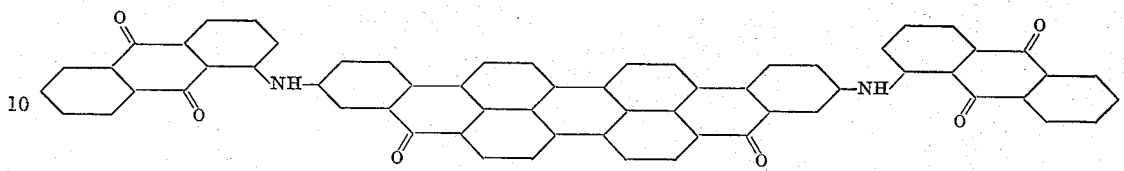

in which each of the -NH- groups may form part of a carbazol ring and in which the anthraquinone nucleus may be substituted by halogen amino, hydroxy or methoxy groups, which dyestuffs furnish violet vats, dissolve to brownish violet solutions in concentrated sulphuric acid, the colour changing to brown olive on the addition of a few drops of nitric acid, dye the vegetable fiber black shades and are obtainable by condensing a 1'-anthraquinonyl-6-aminobenzanthrone which may contain in the anthraquinone nucleus one of the said substituents, by means of caustic alkali at elevated temperature.

8. As a new article of manufacture the vat dyestuff probably corresponding to the formula:

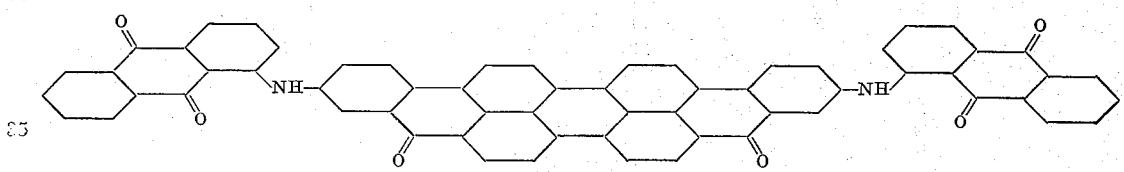

in which each of the -NH- groups may form part of a carbazol ring, which dyestuff furnishes a violet vat, dissolves to a brownish violet solution in concentrated sulphuric acid, the colour changing to brown olive on the addition of a few drops of nitric acid, dyes the vegetable fiber bluish black shades and is obtainable by condensing 1'-anthraquinonyl-6-aminobenzanthrone by means of alcoholic caustic alkali at between 150° and 155° C.

In testimony whereof we have hereunto set our hands.

HUGO WOLFF.
MAX ALBERT KUNZ.
KARL KÖBERLE.